Sept. 6, 1949.　　　　C. J. STUART　　　2,480,976
SHAFT COUPLING
Filed May 8, 1946
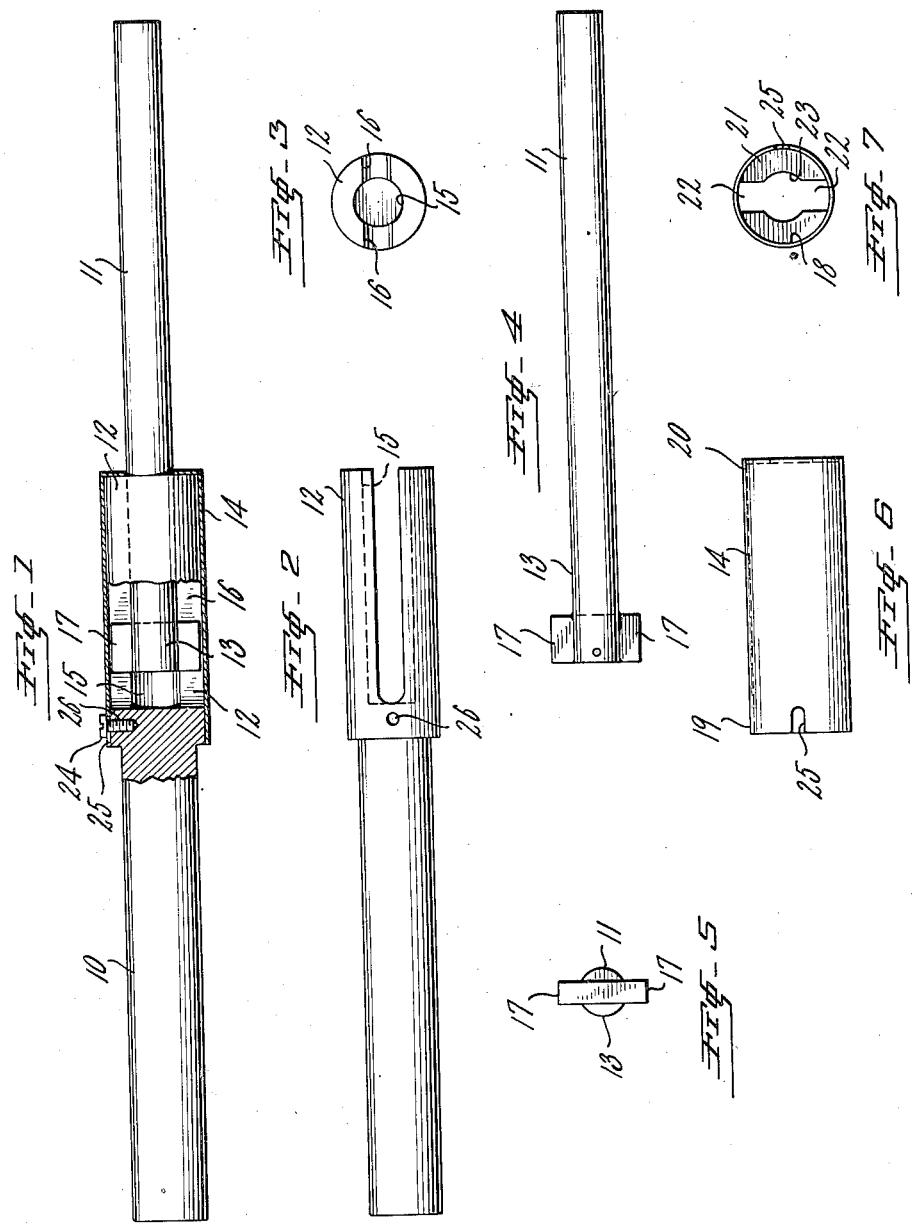
INVENTOR
CHARLES J. STUART
BY
William N. Epes
ATTORNEY Patented Sept. 6, 1949

2,480,976

UNITED STATES PATENT OFFICE 2,480,976

SHAFT COUPLING

Charles J. Stuart, Winchester, Mass., assignor to Wellman Company, Medford, Mass., a corporation of Maine Application May 8, 1946, Serial No. 668,100

2 Claims. (Cl. 287—113)

This invention relates to an axially slidable shaft coupling, and particularly to such a coupling having a reinforcing dust and grease guard.

The purpose of the present invention is to construct a shaft coupling which provides a slidable connection between two shafts, and which is relatively light, easy to assemble and disassemble, and also capable of transmitting relatively heavy loads. It is expedient to make shaft couplings with a slidable telescoping connection between the shafts, in which the connecting part on one shaft is tubular and is provided with longitudinal slots, to receive a part on the other shaft which extends into the tube and has radial projections thereon which extend into the slots to prevent relative rotation between the telescoping parts. In such construction heretofore made, the tube is weakened by the formation of the slots, and the strains imposed thereon, particularly at the ends thereof, by the radial projections, which tend to cause the tube to split and separate, unless it is made of relatively heavy metal.

According to the present invention, the prior slotted type of extensible shaft coupling is used, but the tube is provided with an outer reinforcing member in the form of a dust and grease guard, which not only reinforces the slidable connection, but also encloses and retains the lubricant therein around the moving bearing surfaces, and protects them from abrasion by extraneous particles.

This invention will be more clearly understood by referring to the following description and the accompanying drawings in which:

Fig. 1 is an assembled side view with some parts in section of a shaft coupling embodying this invention;

Fig. 2 is a side view of the slotted tubular member;

Fig. 3 is an end view of the tubular member shown in Fig. 2;

Figs. 4 and 5, respectively, are side and end views of the inner telescoping member, which is adapted to be connected to the other shaft; and Figs. 6 and 7 are, respectively, side and end views of the dust and grease guard.

Referring to the drawings, the shaft coupling comprises two rotatable members 10 and 11 which may be adapted to be connected to the shafts to be coupled together, or they may constitute the shafts themselves. The member 10 is provided with a tubular end 12 into which the end 13 of the member 11 is adapted to slide. A dust and grease guard 14 fits over the slidable connection between the members 10 and 11.

The tubular end 12 is provided with a bore 15 adapted to receive the end head 13 of the member 11 with a slidable fit. The tubular walls of the member 12 are provided with diametrically opposed slots 16 which are adapted to receive the radial projections 17 on the member 11, and thereby provide a non-rotatable slidable connection between these two members.

The dust and grease guard 14 has an internal bore 18 adapted to fit over the tubular end 12 with a close slidable fit. The end 19 of the guard 14 which extends over the member 12 is open, and the other end 20 is provided with an inwardly turned flange 21 having interconnected diametrically extending slots 22 and circular opening 23 therein of such a size and shape as to closely fit over the end 13 of the member 11 with the projections 17 thereon. The slots 22 are provided so that the guard 14 can be slipped over the end 13 in the event the other end is fixed in another member.

In assembling the apparatus, the flanged end of the guard 14 is slipped over the projections 17 on the member 11 before its end 13 is inserted in the bore 15 and slots 16 of the member 12, and after all these parts have been well lubricated. The end 13 is then inserted in the member 12, and the open end 19 of the guard 14 is slipped over the tubular member 12. The guard 14 is secured in place, with the diametrical slots 22 in the guard arranged at 90° to the diametrical slots 16 in the member 12, by means of a screw 24 which extends through a slot 25 in the guard 14 and into a threaded bore 26 in the member 12.

When the parts are thus assembled the members 10 and 11 are slidable axially, but non-rotatably in respect to each other, and the guard 14 having the flange 21 placed adjacent to the open slotted end of the member 12 reinforces it against the spreading action of the projections 17 when rotary motion is transmitted between the members 10 and 11. The guard 14 also excludes abrasive particles from the slidable connection, and retains the lubricant therein. If desirable, sufficient tolerance can be allowed between the sliding parts to permit a universal or orbital motion to prevent the binding action in the connection in the event the shafts to be connected are not accurately aligned.

The preferred form of this invention has been described herein, but it will be understood that changes in the details thereof may be made without departing from the spirit of the invention, or the scope of the appended claims.

Having thus described my invention, what I claim and desire to protect by Letters Patent is:

1. A slidable shaft coupling comprising telescoping inner, intermediate, and outer members, said intermediate member being adapted to be connected to one shaft and said inner member being adapted to be connected to the other shaft, said intermediate member having diametrical slots extending through its side and end walls, a head on said inner member comprising diametrical projections extending into said slots and forming a slidable and non-rotatable connection between said inner and intermediate members, said outer member having an open end and slidable over said intermediate member with a close fit, a closure flange on said outer member having a central opening therein and diametrical slots extending therefrom and corresponding in shape and size to the end view of said inner member and said projections thereon, and means for securing said outer member on said intermediate member with said slots in each of said members out of registration with each other.

2. A slidable shaft coupling comprising a tubular member rotatable with one shaft, an inner member rotatable with the other shaft, said tubular member having an open end, said inner member extending into said tubular member through its open end and having a slidable and non-rotatable connection therewith, said connection comprising longitudinal slots extending through the side and end walls of said tubular member and inwardly from its open end, radial projections on said inner member extending into said slots and adapted to slide longitudinally thereof to provide a longitudinal extensible connection between the shafts, an outer tubular member adapted to slide with a close fit over said first tubular member, said outer member having an inwardly turned flange provided with an opening therein and slots extending therefrom of the shape and size of the end view of said inner member and the projections thereon, and means for securing said outer member on said intermediate member with said slots in said members out of registration with each other.

CHARLES J. STUART.

REFERENCES CITED

The following references are of record in the file of this patent:

UNITED STATES PATENTS

| Number | Name | Date |
|---|---|---|
| 1,136,091 | Bloom | Apr. 20, 1915 |
| 1,788,565 | Davis | Jan. 13, 1931 |